United States Patent
Pulle et al.

(10) Patent No.: US 12,222,836 B2
(45) Date of Patent: Feb. 11, 2025

(54) RENDERING A STACK TRACE VISUALIZATION DISPLAY

(71) Applicant: Salesforce, Inc., San Francisco, CA (US)

(72) Inventors: Ravi Sankar Pulle, San Francisco, CA (US); Ajay Krishna Borra, San Francisco, CA (US); Alexander Kouthoofd, San Francisco, HI (US)

(73) Assignee: Salesforce, Inc.

( * ) Notice: Subject to any disclaimer, the term of this patent is extended or adjusted under 35 U.S.C. 154(b) by 154 days.

(21) Appl. No.: 18/180,970

(22) Filed: Mar. 9, 2023

(65) Prior Publication Data

US 2024/0303173 A1    Sep. 12, 2024

(51) Int. Cl.
G06F 11/32    (2006.01)
G06F 11/30    (2006.01)
G06F 11/36    (2006.01)

(52) U.S. Cl.
CPC .......... G06F 11/323 (2013.01); G06F 11/302 (2013.01); G06F 11/3612 (2013.01); G06F 11/3664 (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

Gregg, Brendan, "The Flame Graph," ACM, 2016, 10pg. (Year: 2016).*

(Continued)

Primary Examiner — Ryan D. Coyer
(74) Attorney, Agent, or Firm — Lorenz & Kopf, LLP

(57) ABSTRACT

A method and system for rendering a stack trace visualization display has been developed. A first stack trace associated with execution of an application during a time period is received from a central processing unit profiler. A first stack trace visualization display is rendered including a plurality of stack frames stacked in accordance with an order of ancestry based on the first stack trace. Rendering at least one stack frame involves rendering at a first location of the first stack trace visualization display, a stack frame rectangle for the at least one stack frame in accordance with the order of ancestry and rendering at a second location of the first stack trace visualization display, stack frame specific text for the at least one stack frame. The second location overlays the first location. Rendering of the stack frame rectangle is independent of the rendering of the stack frame specific text.

20 Claims, 9 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Oomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0229770 A1* | 8/2014 | Klic ............... G06F 11/366 714/45 |
| 2014/0229919 A1* | 8/2014 | Spiridonov ......... G06F 11/34 717/125 |
| 2018/0143894 A1* | 5/2018 | Singh ............ G06F 11/3636 |
| 2019/0391902 A1* | 12/2019 | Oka ............. G06F 11/3608 |

OTHER PUBLICATIONS

Lee et al., "STAT: the Stack Trace Analysis Tool," Lawrence Livermore National Laboratory, 2020, 58pg. (Year: 2020).*

(56) References Cited

OTHER PUBLICATIONS

De Moraes, Pedro Henrique Sousa, "Willow: A Tool for Interactive and Algorithms Visualization," Universidade Federal de Pernambuco, 2020, 114pg. (Year: 2020).*

* cited by examiner

| Path 0:0:0 | Path 0:0:0:1 | Path 0:0:0:2 | |
|---|---|---|---|
| | Path 0:1 | | |
| Path 0 | | | |
| Path 0 | | | |

FIG. 5A

| Path 0:0:0:2 |
|---|
| Path 0:1 |
| Path 0 |
| Path 0 |

FIG. 5B

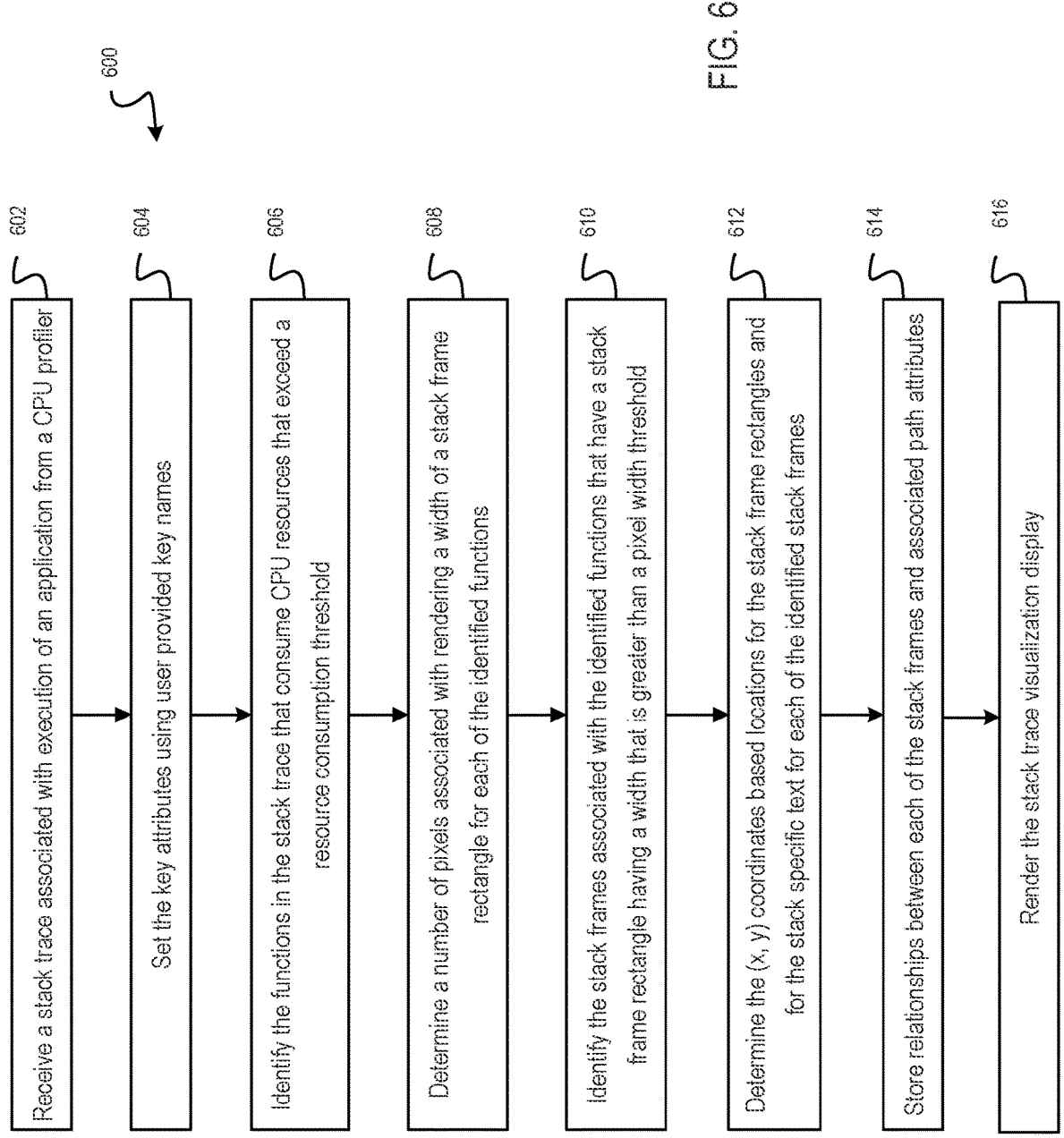

RENDERING A STACK TRACE VISUALIZATION DISPLAY

TECHNICAL FIELD

Embodiments of the subject matter described herein relate generally to application performance profiling and more particularly, embodiments of the subject matter relate to systems and methods for rendering a stack trace visualization display associated with execution of an application.

BACKGROUND

Applications often include multiple independently deployable services. Use of distributed tracing tools enables a user to track a request as it flows through disparate functions within an application. Tracing tools facilitate collection of latency and error data for a request, as well as for each function call along a request pathway. A monitoring tool typically receives this data and displays it in the form of a stack trace visualization display.

An example of a stack trace visualization display is a flame graph. Flame graphs allow users to see the relationships between function calls and the aspects of a request journey along a request pathway associated with relatively high latencies or errors. In some instances, errors or latencies in one function within an application can impact dependent functions within the application. A flame graph provides a visualization of a distributed request trance and represents each function call that occurs during the request execution path with a timed, color-coded, horizontal bar. Frame graphs for distributed traces include error and latency data that enable users to identify and fix bottlenecks in their applications.

Rendering a stack trace visualization display with a large profile using existing plugins can take tens of seconds. Existing plugins often specify that JavaScript Object Notation (JSON) tree structures be defined using a pre-defined format with defined keys and may introduce delays associated with a user looking up the predefined formats and keys. In addition, the use of search and zoom features in existing plugins may introduce delays associated with renderings of a stack trace visualization display.

Accordingly, there is a need in the art for a method and system for reducing the time associated with rendering a stack trace visualization display.

BRIEF DESCRIPTION OF THE DRAWINGS

The present invention will hereinafter be described in conjunction with the following drawing figures, wherein like numerals denote like elements, and wherein:

FIG. 2 is a block diagram representation of an embodiment of a stack trace visualization display system plug-in;

FIG. 5A is a diagrammatic representation of an example of path attributes associated with a stack frame in accordance with an embodiment;

FIG. 5B is a diagrammatic representation of the example path for traversing the JSON tree associated with the stack frame having a path 0:1 in FIG. 5A in accordance with an embodiment;

FIG. 6 is a flowchart representation of an exemplary embodiment of a method of rendering a stack trace visualization display;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. Example embodiments will now be described more fully with reference to the accompanying drawings.

Figure 1:
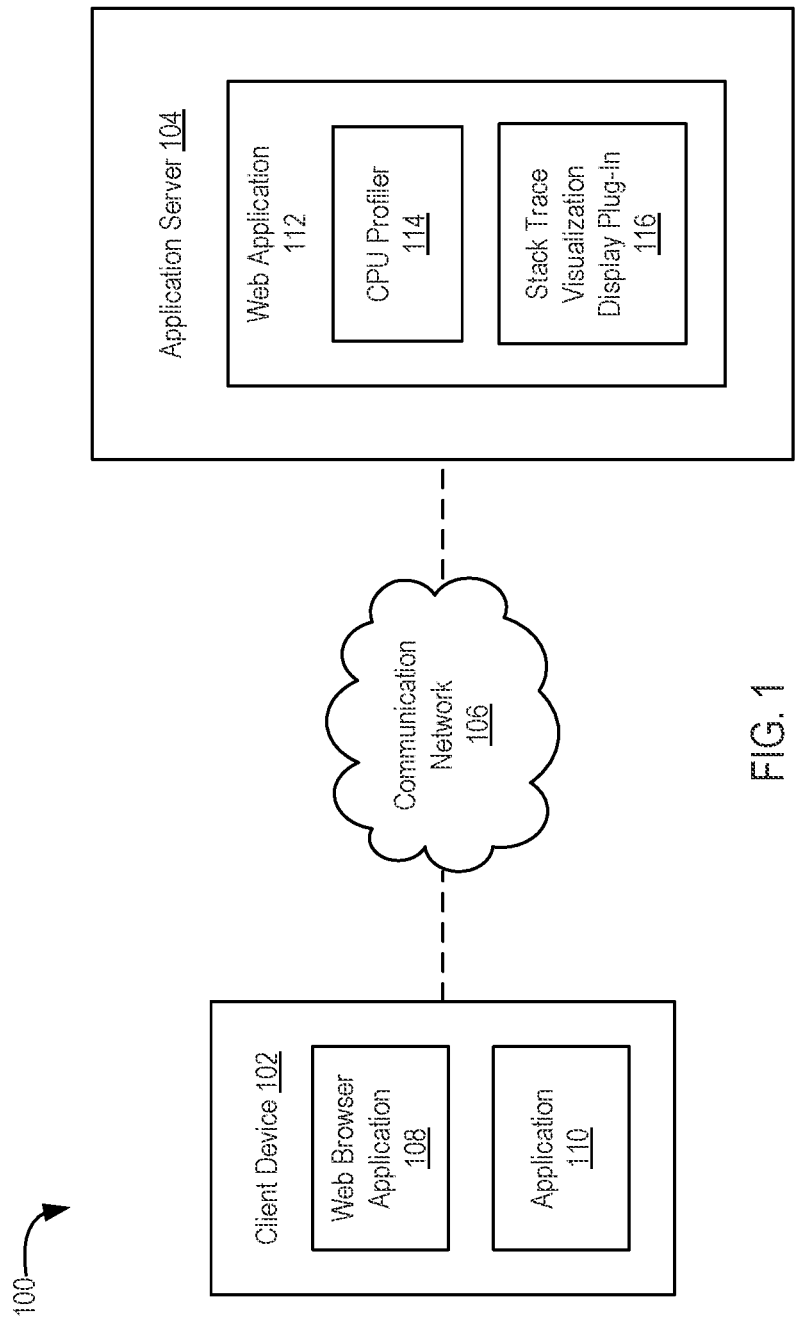
FIG. 1 is a block diagram representation of a system configured to implement rendering of a stack trace visualization display in accordance with an embodiment.

Referring to FIG. 1, a block diagram representation of a system 100 configured to implement rendering of a stack trace visualization display in accordance with an embodiment is shown. It should be appreciated that FIG. 1 depicts a simplified representation of the system 100 for purposes of explanation and is not intended to be limiting.

The system 100 includes a client device 102 and an application server 104. The client device 102 is configured to be communicatively coupled to the application server 104 via a communication network 106. Examples of communication networks 106 include, but are not limited to, the Internet, any combination of a wired and/or wireless computer network, a cellular network, a mobile broadband network, and a radio network.

The client device 102 includes a web browser application 108 and an application 110. The client device 102 may include other components that facilitate operation of the client device 102. The application server 104 includes a web application 112. The web application 112 includes a central processing unit (CPU) profiler 114 and a stack trace visualization display plug-in 116. The application server 104 may include other components that facilitate operation of the application server 104. The application server 104 is configured to provide instances of the web application 112 on the client device 102. The client device 102 is a computing device that may be utilized by a user to access the web application 112 on the application server 104.

The CPU profiler 114 is configured to periodically collect running stack traces of the threads running in the application 110. The CPU profiler 114 provides the stack traces to the client device 102 in the form of a JavaScript Object Notation (JSON) tree. The stack trace visualization display plug-in 116 is configured to receive the stack traces from the CPU profiler and render a stack trace visualization display of the stack traces collected by the CPU profiler 114 on a display of the client device 102.

In an embodiment, the stack trace visualization display plug-in 116 is a JavaScript plug-in. In an embodiment, the web browser application 108 obtains the stack trace visualization display plug-in 116 from the application server 104. The stack trace visualization display plug-in 116 runs on the web browser application 108 to generate the stack trace visualization display at the client device 102. In an embodiment, the stack trace visualization display plug-in 116 is configured to render a stack trace visualization display of the stack traces collected by the CPU profiler 114 on a display of the client device 102 in accordance with a flame graph display format. In an embodiment, the stack trace visualization display plug-in 116 is a client side flame graph generator.

In exemplary embodiments, the client device 102 includes a display device, such as a monitor, screen, or another conventional electronic display, capable of graphically presenting data and/or information provided by the web browser application 108 along with a user input device, such as a touchscreen, a touch panel, a mouse, a joystick, a directional pad, a motion sensor, or the like, capable of receiving input from the user of the client device 102. The client device 102 is configured to execute or otherwise support the web browser application 108 that communicates with the web application 112 on the application server 104 using a networking protocol. The client device 102 is configured to execute the web browser application 108 to interact with the application server 104 and/or the web application 112 using a networking protocol, such as the hypertext transport protocol (HTTP) or the like, to access or otherwise initiate an instance of the web application 112 being presented on the client device 102.

The application server 104 generally represents a server computing device, server computing system or another combination of processing logic, circuitry, hardware, and/or other components configured to support the web application 112 and related authorization processes, tasks, operations, and/or functions described herein. In this regard, the application server 104 generally includes a processing system, which may be implemented using any suitable processing system and/or device, such as, for example, one or more processors, central processing units (CPUs), controllers, microprocessors, microcontrollers, processing cores and/or other hardware computing resources configured to support the operation of the processing system described herein. The processing system may include or otherwise access a data storage element (or memory) capable of storing programming instructions for execution by the processing system, that, when read and executed, are configurable cause processing system to create, generate, or otherwise facilitate an application platform that generates or otherwise provides instances of a web application 112 at run-time (or "on-demand") based at least in part upon code and other data that is stored or otherwise maintained by the memory, a database, or another location on the communication network 106 and support the authorization processes described herein. Depending on the embodiment, the memory may be realized as a random access memory (RAM), read only memory (ROM), flash memory, magnetic or optical mass storage, or any other suitable non-transitory short or long term data storage or other computer-readable media, and/or any suitable combination thereof.

While the CPU profiler 114 and the stack trace visualization display plug-in 116 have been described as components of a web application 112 on an application server 104, in alternative embodiments, the CPU profiler 114 and/or the stack trace visualization display plug-in 116 may be a standalone application configured to run on the client device 102.

Figure 2:
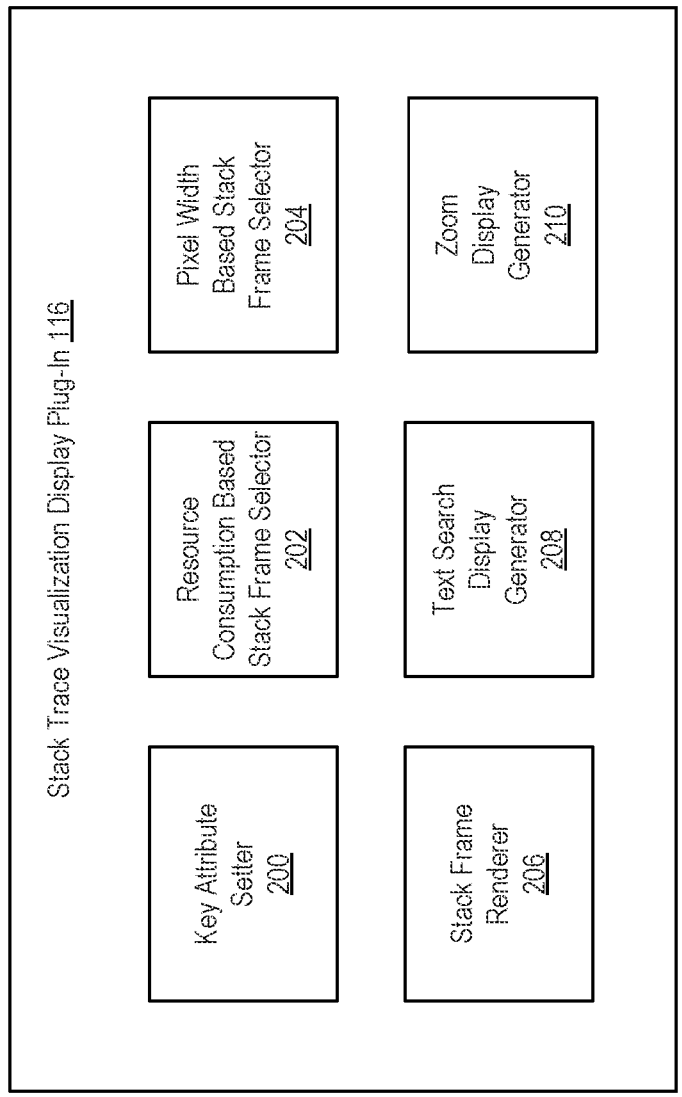

Referring to FIG. 2, a block diagram representation of an embodiment of a stack trace visualization display plug-in 116 is shown. It should be appreciated that FIG. 2 depicts a simplified representation of the stack trace visualization display plug-in 116 for purposes of explanation and is not intended to be limiting. The stack trace visualization display plug-in 116 is configured to receive the stack traces from a CPU profiler 114 and render a stack trace visualization display of the stack traces collected by the CPU profiler 114 on a display of the client device 102.

In an embodiment, the stack trace visualization display plug-in 116 is a JavaScript plug-in. In an embodiment, the stack trace visualization display plug-in 116 is a component of a web application 112 on an application server 104. The stack trace visualization display plug-in 116 is accessed through the web browser application 108. In other words, the stack trace visualization display plug-in 116 is a client-side stack trace visualization display generator. In an embodiment, the stack trace visualization display plug-in 116 is configured to generate stack trace visualization displays in accordance with a flame graph format.

In an embodiment, the stack trace visualization display plug-in 116 includes a key attribute setter 200, a resource consumption based stack frame selector 202, a pixel width based stack frame selector 204, a stack frame renderer 206, a text search display generator 208, and a zoom display generator 210. In alternative embodiments, the stack trace visualization display plug-in 116 includes one or more of the key attribute setter 200, the resource consumption based stack frame selector 202, the pixel width based stack frame selector 204, the stack frame renderer 206, the text search display generator 208, and the zoom display generator 210. The stack trace visualization display plug-in 116 may include additional components that facilitate operation of the stack trace visualization display plug-in 116.

A stack trace visualization display includes a plurality of stack frames. Each stack frame is associated with a number of key attributes. These key attributes are defined using key pairs in a JSON tree. Each key pair includes a key name and a key value. In prior art systems, the key names are pre-defined key names, so a user looks up the pre-defined key names in order to enter key values for the pre-defined key names. As a result, the use of pre-defined key names can be a time-consuming process for a user. An example of a user is a developer.

The key attribute setter 200 is configured to enable a user to customize key names for each of the key attributes. The user defines the key names when entering the key values. The key attribute setter 200 is configured to receive user defined key names for key attributes and user defined key values via a user input device at the client device 102 to generate the key pairs. Time saving is achieved because a user does not have to look up pre-defined key names to enter key values for the different attribute keys. The use of customized key names avoids JSON key strings data conversions by setting them as attributes. Optimization may be achieved by accepting the keys as plug-in properties instead of converting an entire JSON tree structure into a new plug-in specific format.

A first example of a JSON tree structure including key attributes is shown below. In this example, the JSON tree structure includes a first set of customized key names defined by a user via the key attribute setter 200. The user defined customized key names are "name", "size", and "children".

```
{
    name: "root",
    size: 10,
    children: [{
        name: "xxxx",
        size: xx,
        children: [{....}]
    },
    {...}
    ]
}
```

A second example of the same JSON tree structure having the same key attributes with different customized key names is shown below. The second example of the same JSON tree structure includes a second set of key names defined by the user via the key attribute setter 200. The user defined key names are "nm", "sz", and "ch" for the JSON tree structure. The same key values are entered for association with second set of customized key names to create the same key pairs as in the first example.

```
{
    nm: "root",
    sz: 10,
    ch: [{
        nm: "xxxx",
        sz: xx,
        ch: [{....}]
    },
    {...}
    ]
}
```

The stack frame visualization display plug-in 116 is configured to receive CPU profiling data associated with execution of the application 110 at the client device 102 in the form of a stack trace from the CPU profiler 114. The stack frame visualization display plug-in 116 is configured to render a stack trace visualization display based on the received stack trace. A stack trace visualization display includes a plurality of stack frames that are stacked in accordance with an order of ancestry based on the received the stack trace. Each of the stack frames represents a function that is called in connection with the execution of the application 110. The width of each stack frame corresponds to the CPU resources consumed by the associated function. In an embodiment, the stack frame visualization display plug-in 116 is configured to generate the stack frame visualization display in accordance with a flame graph display format.

In an embodiment, the resource consumption based stack frame selector 202 is configured to receive the CPU profiling data in the form of a stack trace from the CPU profiler 114. The CPU profiling data represents the CPU resources consumed by different functions during the execution of the application 110 during a time period. The resource consumption based stack frame selector 202 is configured to compare the CPU resources consumed by the different functions in the received stack trace to a resource consumption threshold and identify the functions that consume CPU resources in excess of the resource consumption threshold.

The functions that consume CPU resources greater than the resource consumption threshold rise to a level of resource consumption that is relevant to a user or developer. When the resource consumption by a function is less than the resource consumption threshold, the resources consumed by such functions may not be relevant to a user or developer. The stack frame visualization display plug-in 116 is configured to render the stack frames associated with functions that consume CPU resources greater than the resource consumption threshold in the stack trace visualization display. By rendering only those stack frames that consume resources above the resource consumption threshold, the time associated with rendering the stack trace visualization display associated with the received stack track is reduced. In an embodiment, the user is provided with the option of defining the resource consumption threshold.

In an embodiment, the pixel width based stack frame selector 204 is configured to receive the CPU profiling data in the form of a stack trace from the CPU profiler 114. A stack trace visualization display includes a plurality of stack frames. The width of a stack frame associated with a function in a stack trace visualization display reflects the resources consumed by that function during the execution of the application 110 during a period of time. In cases where the resource consumption by a function is relatively low, the width of a displayed stack frame associated with that function is relatively narrow. The resources consumed by the functions associated with such stack frames may not be relevant to a user, such a developer.

The pixel width based stack frame selector 204 is configured to determine the number of pixels associated with rendering a width of a display of each stack frame associated with each of the functions executed by the application during the period of time based on the received stack trace. The pixel width based stack frame selector 204 is configured to compare the number of pixels associated with rendering the width of each of the stack frames with a pixel width threshold and identify the stack frames where the number of pixels associated with displaying the width of the stack frame is greater than the pixel threshold.

The stack trace visualization display plug-in 116 is configured to render only those stack frames that have been identified as having a pixel width that is greater than the pixel threshold in the stack trace visualization display. The stack frames having a width that is less than the pixel threshold may not be visually significant and may not be of interest to a user or developer compared to the stack frames having a pixel width that is greater than the pixel threshold. By rendering only those stack frames that have a pixel width that is greater than the pixel threshold, the time associated with rendering the stack trace visualization display associated with the received stack track is reduced. In an embodiment, a user is provided with the option of setting the pixel threshold as an input to the stack trace visualization display plug-in 116. In an embodiment, the stack trace visualization display plug-in 116 is configured to display the stack frames that are not included in the original stack trace visualization display in response to a zoom request associated with a stack frame.

Figure 3:
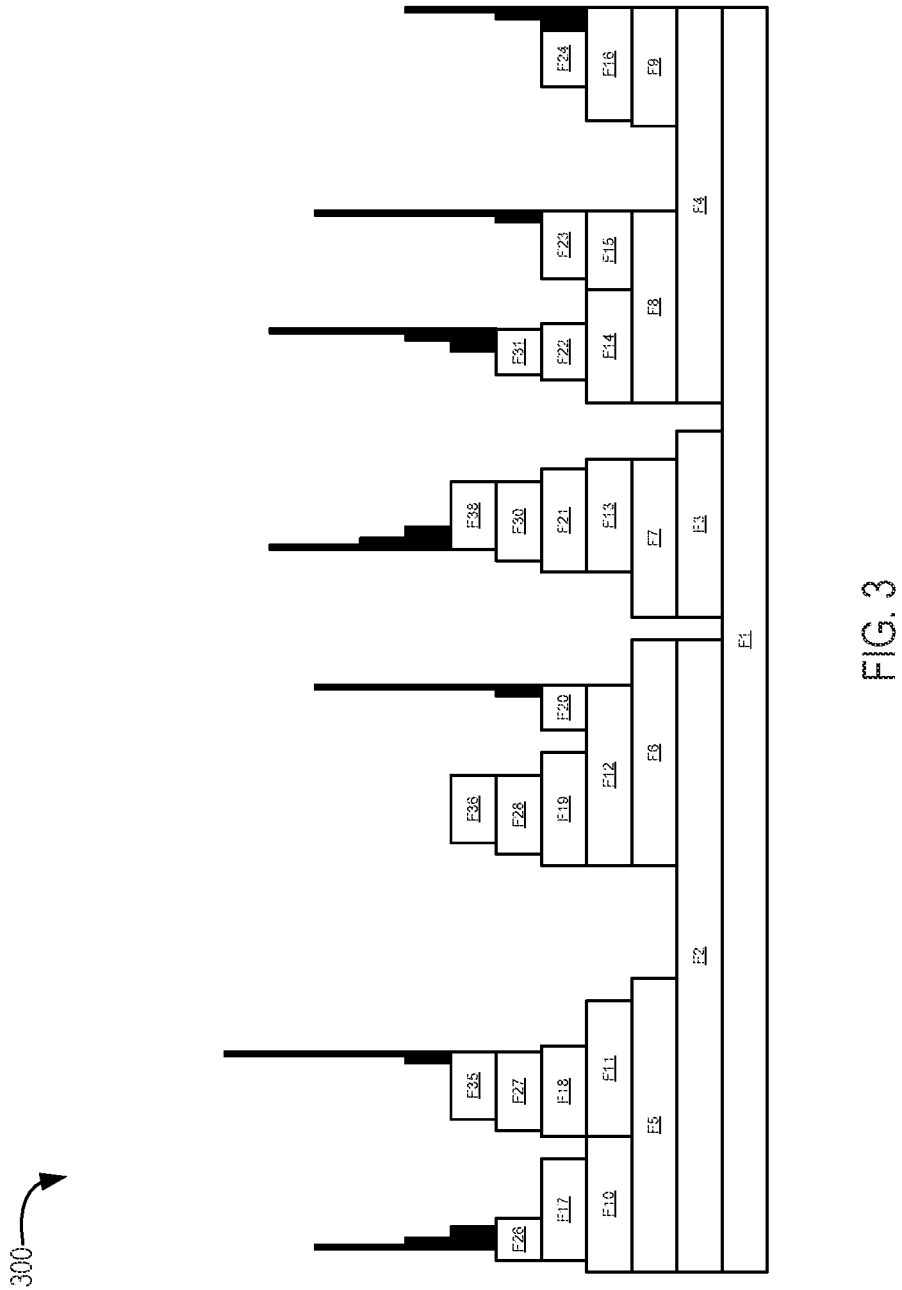
FIG. 3 is an exemplary representation of a stack trace visualization display in accordance with an embodiment.

Referring to FIG. 3, an exemplary representation of a stack trace visualization display 300 in accordance with an embodiment is shown. It should be appreciated that FIG. 3 depicts a simplified representation of the stack trace visualization display 300 for purposes of explanation and is not intended to be limiting. The example stack trace visualization display 300 for a stack trace includes stack frames for sixty-four different functions F1-F64. Those stack frames having a width sufficient to display the stack frame specific text have the functions identified within the stack frame. The stack frames in the stack trace that have been identified by one or both of the resource consumption based stack frame selector 202 and the pixel width based stack frame selector 204 as falling below the resource consumption threshold and the pixel width threshold, respectively, have been identified with dark shading.

Figure 4:
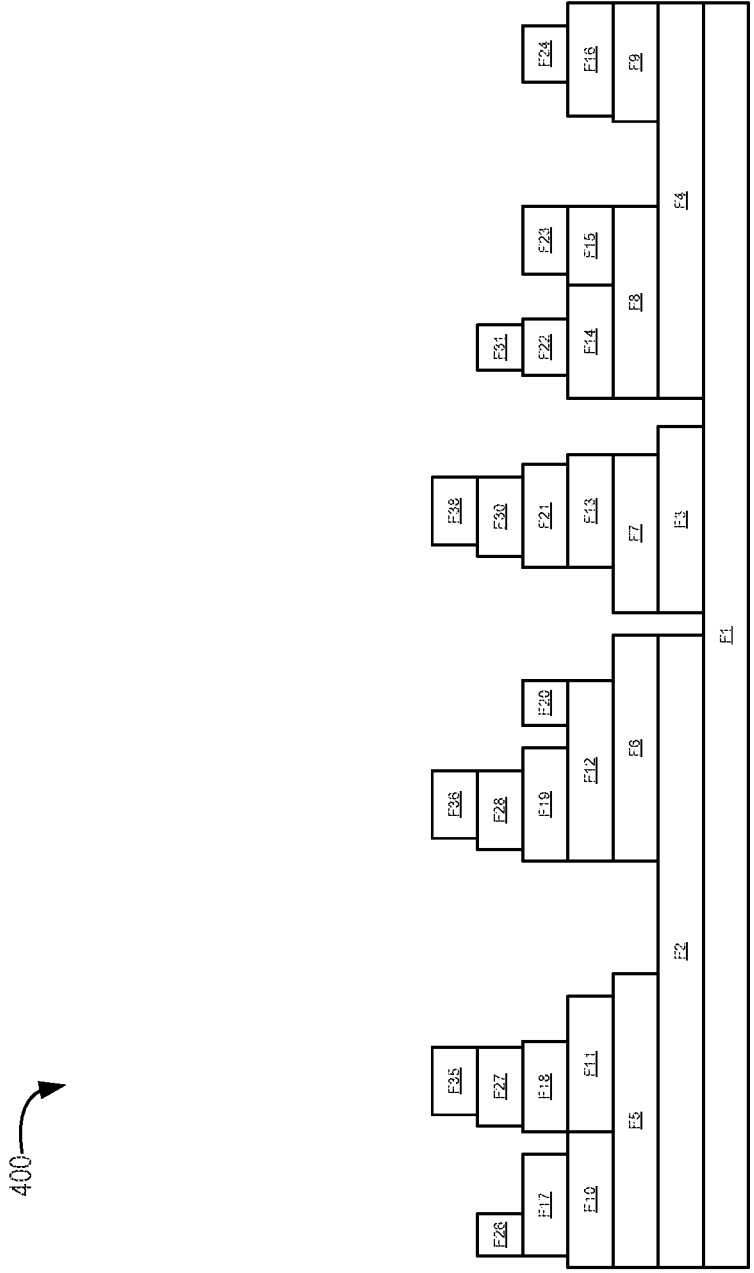
FIG. 4 is an exemplary representation of the stack trace visualization display of FIG. 3 in accordance with an embodiment.

FIG. 4 is an exemplary representation of the stack trace visualization display 400 of FIG. 3 in accordance with an embodiment is shown. It should be appreciated that FIG. 4 depicts a simplified representation of the stack trace visualization display 400 for purposes of explanation and is not intended to be limiting. The stack trace visualization display 400 depicts the stack trace visualization display 300 of FIG. 3 with the stack frames that have identified by one or both of the resource consumption based stack frame selector 202 and the pixel width based stack frame selector 204 as falling below the resource consumption threshold and the pixel width threshold, respectively, removed from the stack trace visualization display 300 to generate the stack trace visualization display 400. Instead of rendering the stack trace visualization display 300 including stack frames that have identified by one or both of the resource consumption based stack frame selector 202 and the pixel width based stack frame selector 204 as falling below the resource consumption threshold and the pixel width threshold, respectively, the stack trace visualization display plug-in has displayed the stack trace visualization display 400 without the identified stack frames (represented by dark shading). By rendering only those stack frames associated with functions that have a resource consumption below the resource consumption threshold and have a pixel width that is greater than the pixel threshold, the time associated with rendering the stack trace visualization display associated with the received stack track is reduced.

Referring back to FIG. 2, as mentioned above, a stack trace visualization display illustrates a stack trace associated with execution of an application 110 on the client device 102 during a period of time. The stack trace includes a plurality of stack frames that are stacked in accordance with an order of ancestry. Each stack frame represents a function called during the execution of the application 110. Each stack frame is defined by a stack frame rectangle and stack frame specific text. Rendering each stack frame as a scalar vector graphic where the stack frame rectangle and the stack frame specific text are displayed together as a group may lead to time inefficiencies associated with rendering the stack trace visualization display.

In an embodiment, the stack frame renderer 206 is configured to define a stack trace visualization display by an (x, y) coordinate system. The stack frame renderer 206 is configured to define a location of each of the stack frame rectangles associated with each of the stack frames in the stack trace visualization display using (x, y) coordinates. The stack frame renderer 206 is configured to define a location of the stack frame specific text associated with each of the stack frames in the stack frame visualization display using (x, y) coordinates.

The stack trace visualization display plug-in 116 is configured to render each of the stack frame rectangles associated with each of the stack frames in accordance with the defined (x, y) coordinates of the location of the stack frame rectangle in the stack frame visualization display. The stack trace visualization display plug-in 116 is configured to render the stack frame specific text associated with each of the stack frames in accordance with the defined (x, y) coordinates of the location of the stack frame specific text in the stack frame visualization display. The stack frame rectangle associated with a stack frame is rendered independently of the stack frame specific text associated with that stack frame in the stack frame visualization display. The location of the stack frame specific text for a stack frame in the stack trace visualization display overlays the location of the stack frame rectangle for that stack frame in the stack trace visualization display. Rendering of the stack frame specific text associated with a stack frame independently of rendering of the stack frame rectangle of the stack frame by the stack frame visualization display plug-in 116 may reduce the time associated with rendering a stack trace visualization display compared to the rendering of a stack frame as a scaler vector graphic where the stack frame rectangle and the stack frame specific text are rendered together as a group.

The text search display generator 208 is configured to generate a new stack trace visualization display for display on a display device at the client device 102 in response to a search request for stack frame text. A stack trace visualization display includes a plurality of stack frames. Each stack frame is associated with stack frame specific text. The text search display generator 208 is configured to receive a search request for stack frame text in the stack frame specific text in a displayed version of the stack trace visualization display.

The text search display generator 208 is configured to identify the stack frames in the displayed stack trace visualization display where the stack frame specific text includes the requested stack frame text. The text search display generator 208 is configured to generate a new stack trace visualization display where the stack frames that include the searched stack frame text are displayed in a format that is different from the other stack frames in the stack trace visualization display. The entire stack trace visualization display is re-rendered on the display of the client device 102. In an embodiment, the text search display generator 208 is configured to generate a new stack trace visualization display where the stack frames that include the searched stack frame text are highlighted. Existing systems typically search for the stack frames that include the stack frame text and individually highlight those stack frames within an existing stack trace visualization display. Re-rendering an entire stack trace visualization display to display the stack frames that include the searched stack frame text may reduce the time associated with rendering the stack trace visualization display.

A stack trace visualization display includes a zoom feature that a user can use to issue a zoom request for a stack frame to see a zoomed stack trace associated with that stack frame. Each stack frame is associated with a JSON tree. Typically using a zoom request for a stack frame in a stack trace visualization display involves traversing the entire JSON tree to find the path attributes to display the zoomed stack trace.

The zoom display generator 210 is configured to identify the path attributes for each of the stack frames in a stack trace received from the CPU profiler 114 based on the JSON tree associated with the stack frame. The zoom display generator 210 is configured to store an association between each of the stack frames and the associated path attributes. In an embodiment, the zoom display generator 210 is configured to store an association between each of the stack frames and the associated path attributes in a look-up table.

When the stack trace visualization display plug-in 116 receives a zoom request to see a zoomed stack trace for a stack frame, the zoom display generator 210 is configured to receive the zoom request and retrieve the stored path attributes associated with the stack frame. The zoom display generator 210 is configured to render the zoomed stack trace for the stack frame in accordance with the retrieved path attributes. The use of previously stored relationships between stack frames and path attributes may reduce the time associated with rendering a zoomed stack trace display for a stack frame in response to a zoom request.

Referring to FIG. 5A, a diagrammatic representation of an example of path attributes associated with a stack frame in accordance with an embodiment is shown. The path value changes only when there is a division at a branch. Referring to FIG. 5B, a diagrammatic representation of the example path for traversing the JSON tree associated with the stack frame having the path 0:1 in FIG. 5A in accordance with an embodiment is shown. The associations between the stack frame and the path attributes are stored by the zoom display generator 210. For example, when a user clicks on the stack frame with the path "0:1" the JSON tree will be traversed by following the stored path attributes. The zoom display generator 210 is configured to render the parent stack frame and then construct a child stack trace visualization display associated with the stack frame that has been selected for zooming.

Referring to FIG. 6, a flowchart representation of an exemplary embodiment of a method 600 of rendering a stack trace visualization display is shown. The method 600 is implemented by an embodiment of a stack trace visualization display plug-in 116.

At 602, the stack trace visualization display plug-in 116 receives a stack trace associated with execution of an application 110 at a client device 102 from a CPU profiler 114. At 604, a user sets key attributes by defining customized key names when entering key values via the stack trace visualization display plug-in 116. At 606, the stack trace visualization display plug-in 116 identifies the functions in the stack trace that consume CPU resources that exceed a resource consumption threshold. At 608, the stack trace visualization display plug-in 116 determines a number of pixels associated with rendering a width of a stack frame rectangle for each of the identified functions. At 610, the stack trace visualization display plug-in 116 identifies the stack frames associated with the identified functions that have a stack frame rectangle having a width that is greater than a pixel width threshold. At 612, the stack trace visualization display plug-in 116 determines the (x, y) coordinate based locations for the stack frame rectangles and for the stack specific text for each of the identified stack frames in the stack trace visualization display. At 614, the stack trace visualization display plug-in 116 stores relationships between each of the stack frames and associated path attributes.

At 616, the stack trace visualization display plug-in 116 renders the stack trace visualization display on a display device of the client device 102. The stack trace visualization display plug-in 116 uses the (x, y) coordinates for each of the stack frame rectangles to render the stack frame rectangles for each of the stack frames and the (x, y) coordinates for each of the stack frame specific text to render the stack frame specific text for each of the stack frames. The rendering of the stack frame rectangles for each stack frame is independent of the rendering of each stack frame specific text for each of the stack frames.

When the stack trace visualization display plug-in 116 receives a search request for stack frame text in the stack frame visualization display, the stack trace visualization display plug-in 116 identifies the stack frames in the stack trace visualization display where the stack frame specific text for the stack frames includes the stack frame text. The stack trace visualization display plug-in 116 generates a new stack trace visualization display where the stack frames that include the searched stack frame text are displayed in a format that is different from the other stack frames in the stack trace visualization display. The entire stack trace visualization display is re-rendered on the display of the client device 102 by the stack trace visualization display plug-in 116.

When the stack trace visualization display plug-in 116 receives a zoom request to see a zoomed stack trace for a stack frame in the stack trace visualization display, the stack trace visualization display plug-in 116 retrieves the stored path attributes associated with the stack frame. The stack trace visualization display plug-in 116 renders the zoomed stack trace for the stack frame in accordance with the retrieved path attributes.

The use of an embodiment of a stack trace visualization display plug-in 116, for example to render flame graphs, typically renders four to five times an increases in stack trace visualization display rendering operation, search operation, and zoom operation performance compared to prior art stack trace visualization display systems. Furthermore, the use of an embodiment of a stack trace visualization display plug-in 116 eliminates the need for JSON reformatting to match key names.

Figure 7:
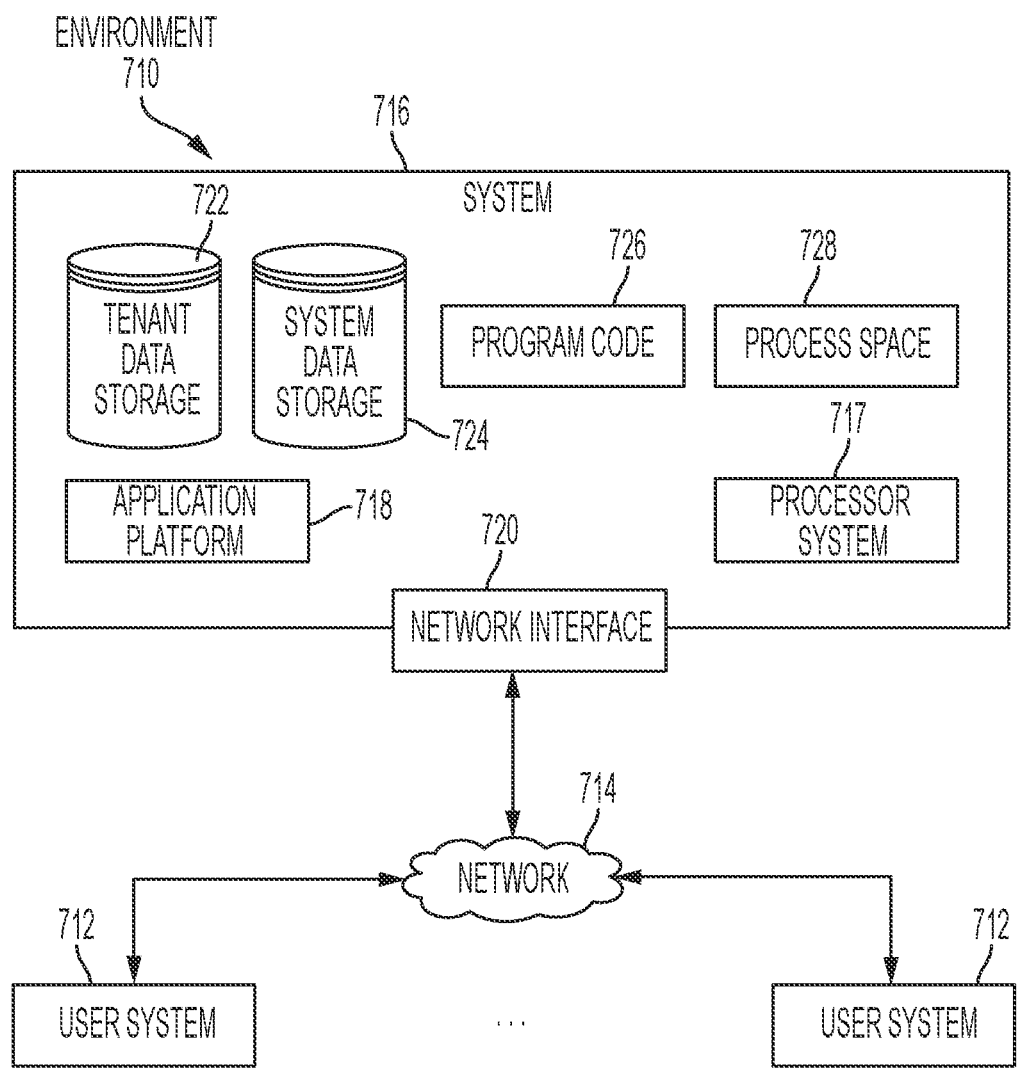
FIG. 7 is a block diagram representation of an example of an environment in which an on-demand database service can be used in accordance with some implementations.

FIG. 7 shows a block diagram of an example of an environment 710 in which an on-demand database service can be used in accordance with some implementations. The environment 710 includes user systems 712 (also referred to a client device), a network 714, a database system 716 (also referred to herein as a "cloud-based system"), a processor system 717, an application platform 718, a network interface 720, tenant database 722 for storing tenant data 723, system database 724 for storing system data 725, program code 726 for implementing various functions of the system 716, and process space 728 for executing database system processes and tenant-specific processes, such as running applications as part of an application hosting service. In some other implementations, environment 710 may not have all of these components or systems, or may have other components or systems instead of, or in addition to, those listed above.

In some implementations, the environment 710 is an environment in which an on-demand database service exists. An on-demand database service, such as that which can be implemented using the system 716, is a service that is made available to users outside of the enterprise(s) that own, maintain or provide access to the system 716. As described above, such users generally do not need to be concerned with building or maintaining the system 716. Instead, resources provided by the system 716 may be available for such users' use when the users need services provided by the system 716; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 718 can be a framework that allows the applications of system 716 to execute, such as the hardware or software infrastructure of the system 716. In some implementations, the application platform 718 enables the creation, management and execution of one or more applications developed by the provider of the on-demand database service, users accessing the on-demand database service via user systems 712, or third-party application users accessing the on-demand database service via user systems 712.

In some implementations, the system 716 implements a web-based customer relationship management (CRM) system. For example, in some such implementations, the system 716 includes application servers configured to implement and execute CRM software applications as well as provide related data, code, forms, renderable webpages and documents and other information to and from user systems 712 and to store to, and retrieve from, a database system related data, objects, and Webpage content. In some MTS implementations, data for multiple tenants may be stored in the same physical database object in tenant database 722. In some such implementations, tenant data is arranged in the storage medium(s) of tenant database 722 so that data of one tenant is kept logically separate from that of other tenants so that one tenant does not have access to another tenant's data, unless such data is expressly shared. The system 716 also implements applications other than, or in addition to, a CRM application. For example, the system 716 can provide tenant access to multiple hosted (standard and custom) applications, including a CRM application. User (or third-party user) applications, which may or may not include CRM, may be supported by the application platform 718. The application platform 718 manages the creation and storage of the applications into one or more database objects and the execution of the applications in one or more virtual machines in the process space of the system 716.

According to some implementations, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 714 can be or include any network or combination of networks of systems or devices that communicate with one another. For example, the network 714 can be or include any one or any combination of a LAN (local area network), WAN (wide area network), telephone network, wireless network, cellular network, point-to-point network, star network, token ring network, hub network, or other appropriate configuration. The network 714 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 712 can communicate with system 716 using TCP/IP and, at a higher network level, other common Internet protocols to communicate, such as HTTP, FTP, AFS, WAP, etc. In an example where HTTP is used, each user system 712 can include an HTTP client commonly referred to as a "web browser" or simply a "browser" for sending and receiving HTTP signals to and from an HTTP server of the system 716. Such an HTTP server can be implemented as the sole network interface 720 between the system 716 and the network 714, but other techniques can be used in addition to or instead of these techniques. In some implementations, the network interface 720 between the system 716 and the network 714 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 712 can be implemented as any computing device(s) or other data processing apparatus or systems usable by users to access the database system 716. For example, any of user systems 712 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 712 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 716) of the user system 712 to access, process and view information, pages and applications available to it from the system 716 over the network 714.

Each user system 712 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 712 in conjunction with pages, forms, applications and other information provided by the system 716 or other systems or servers. For example, the user interface device can be used to access data and applications hosted by system 716, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 712 may differ in their respective capacities, and the capacity of a particular user system 712 can be entirely determined by permissions (permission levels) for the current user of such user system. For example, where a salesperson is using a particular user system 712 to interact with the system 716, that user system can have the capacities allotted to the salesperson. However, while an administrator is using that user system 712 to interact with the system 716, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 712 and some or all of its components are operator-configurable using applications, such as a browser, including computer code executed using a central processing unit (CPU) such as an Intel Pentium® processor or the like. Similarly, the system 716 (and additional instances of an MTS, where more than one is present) and all of its components can be operator-configurable using application(s) including computer code to run using the processor system 717, which may be implemented to include a CPU, which may include an Intel Pentium® processor or the like, or multiple CPUs.

The system 716 includes tangible computer-readable media having non-transitory instructions stored thereon/in that are executable by or used to program a server or other computing system (or collection of such servers or computing systems) to perform some of the implementation of processes described herein. For example, computer program code 726 can implement instructions for operating and configuring the system 716 to intercommunicate and to process webpages, applications and other data and media content as described herein. In some implementations, the computer code 726 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, JAVA®, JAVASCRIPT®, ActiveX®, any other scripting language, such as VBScript®, and many other programming languages as are well known may be used. (JAVA™ is a trademark of Sun Microsystems, Inc.).

Figure 8:
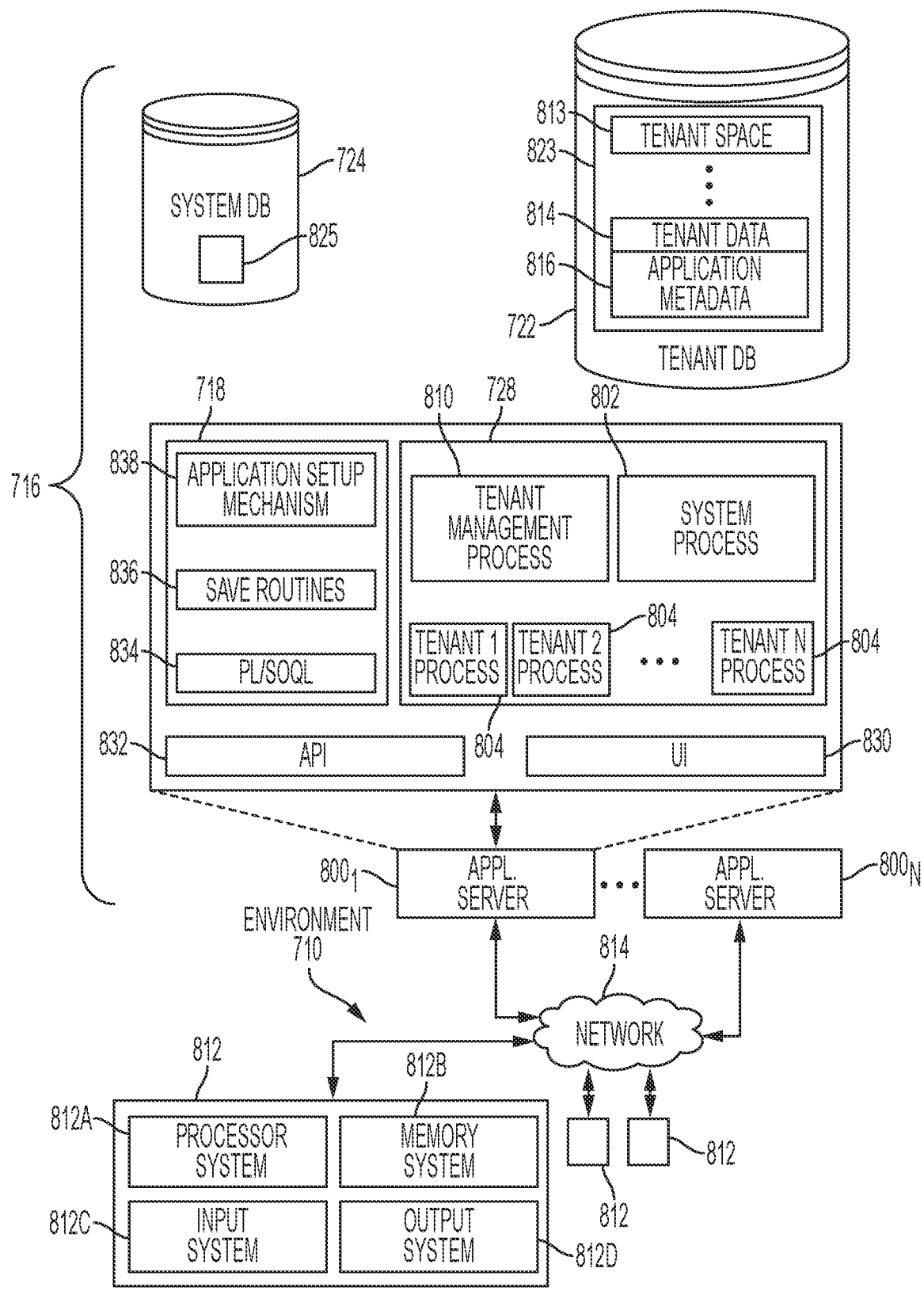
FIG. 8 is a block diagram representation of example implementations of elements of FIG. 7 and example interconnections between these elements according to some implementations.

FIG. 8 shows a block diagram of example implementations of elements of FIG. 7 and example interconnections between these elements according to some implementations. That is, FIG. 8 also illustrates environment 710, but FIG. 8, various elements of the system 716 and various interconnections between such elements are shown with more specificity according to some more specific implementations. Elements from FIG. 7 that are also shown in FIG. 8 will use the same reference numbers in FIG. 8 as were used in FIG. 7. Additionally, in FIG. 8, the user system 712 includes a processor system 812A, a memory system 812B, an input system 812C, and an output system 812D. The processor system 812A can include any suitable combination of one or more processors. The memory system 812B can include any suitable combination of one or more memory devices. The input system 812C can include any suitable combination of input devices, such as one or more touchscreen interfaces, keyboards, mice, trackballs, scanners, cameras, or interfaces to networks. The output system 812D can include any suitable combination of output devices, such as one or more display devices, printers, or interfaces to networks.

In FIG. 8, the network interface 720 of FIG. 7 is implemented as a set of HTTP application servers 8001-800N. Each application server 800, also referred to herein as an "app server," is configured to communicate with tenant database 722 and the tenant data 823 therein, as well as system database 724 and the system data 825 therein, to serve requests received from the user systems 812. The tenant data 823 can be divided into individual tenant storage spaces 813, which can be physically or logically arranged or divided. Within each tenant storage space 813, tenant data 814 and application metadata 816 can similarly be allocated for each user. For example, a copy of a user's most recently used (MRU) items can be stored to tenant data 814. Similarly, a copy of MRU items for an entire organization that is a tenant can be stored to tenant storage space 813.

The process space 728 includes system process space 802, individual tenant process spaces 804 and a tenant management process space 810. The application platform 718 includes an application setup mechanism 838 that supports application users' creation and management of applications. Such applications and others can be saved as metadata into tenant database 722 by save routines 836 for execution by subscribers as one or more tenant process spaces 804 managed by tenant management process 810, for example. Invocations to such applications can be coded using PL/SOQL 834, which provides a programming language style interface extension to API 832. Invocations to applications can be detected by one or more system processes, which manage retrieving application metadata 816 for the subscriber making the invocation and executing the metadata as an application in a virtual machine.

The system 716 of FIG. 8 also includes a user interface (UI) 830 and an application programming interface (API) 832 to system 716 resident processes to users or users at user systems 812. In some other implementations, the environment 710 may not have the same elements as those listed above or may have other elements instead of, or in addition to, those listed above.

Each application server 800 can be communicably coupled with tenant database 722 and system database 724, for example, having access to tenant data 823 and system data 825, respectively, via a different network connection. For example, one application server 8001 can be coupled via the network 714 (for example, the Internet), another application server 800N can be coupled via a direct network link, and another application server (not illustrated) can be coupled by yet a different network connection. Transfer Control Protocol and Internet Protocol (TCP/IP) are examples of typical protocols that can be used for communicating between application servers 800 and the system 716. However, it will be apparent to one skilled in the art that other transport protocols can be used to optimize the system 716 depending on the network interconnections used.

In some implementations, each application server 800 is configured to handle requests for any user associated with any organization that is a tenant of the system 716. Because it can be desirable to be able to add and remove application servers 800 from the server pool at any time and for various reasons, in some implementations there is no server affinity for a user or organization to a specific application server 800. In some such implementations, an interface system implementing a load balancing function (for example, an F5 Big-IP load balancer) is communicably coupled between the application servers 800 and the user systems 812 to distribute requests to the application servers 800. In one implementation, the load balancer uses a least-connections algorithm to route user requests to the application servers 800. Other examples of load balancing algorithms, such as round robin and observed-response-time, also can be used. For example, in some instances, three consecutive requests from the same user could hit three different application servers 800, and three requests from different users could hit the same application server 800. In this manner, by way of example, system 716 can be a multi-tenant system in which system 716 handles storage of, and access to, different objects, data and applications across disparate users and organizations.

In one example storage use case, one tenant can be a company that employs a sales force where each salesperson uses system 716 to manage aspects of their sales. A user can maintain contact data, leads data, customer follow-up data, performance data, goals and progress data, etc., all applicable to that user's personal sales process (for example, in tenant database 722). In an example of an MTS arrangement, because all of the data and the applications to access, view, modify, report, transmit, calculate, etc., can be maintained and accessed by a user system 812 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 716 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 716 also can maintain system level data usable by multiple tenants or other data. Such system level data can include industry reports, news, postings, and the like that are sharable among tenants.

In some implementations, the user systems 812 (which also can be client systems) communicate with the application servers 800 to request and update system-level and tenant-level data from the system 716. Such requests and updates can involve sending one or more queries to tenant database 722 or system database 724. The system 716 (for example, an application server 800 in the system 716) can automatically generate one or more SQL statements (for example, one or more SQL queries) designed to access the desired information. System database 724 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9:
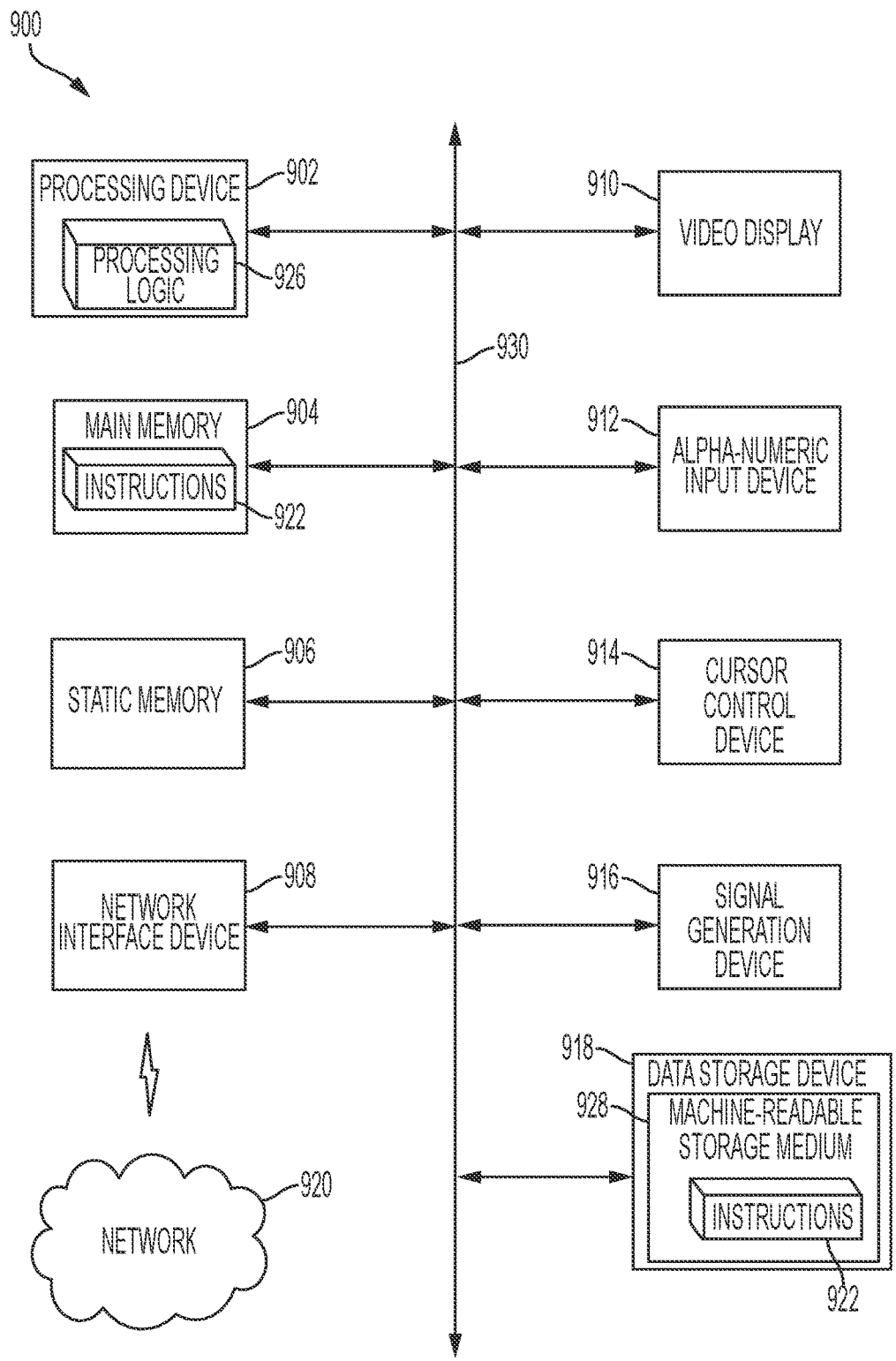
FIG. 9 is a diagrammatic representation of a machine in an exemplary form of a computer system within which a set of instructions, for causing the machine to perform any one or more of the methodologies discussed herein, may be executed.

FIG. 9 illustrates a diagrammatic representation of a machine in the exemplary form of a computer system 900 within which a set of instructions for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a user system, a client device, or a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may represent, for example, elements of the cloud-based computing platform or any other elements of FIG. 1 (e.g. clients 110, computing systems used by the customers 150, the third-party application exchange 160) or any elements of FIGS. 6 through 8, etc.

The exemplary computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 (e.g., instructions of in-memory buffer service 94) embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general-purpose digital computer, by using a special-purpose computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "determining," "analyzing," "identifying," "adding," "displaying," "generating," "querying," "creating," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Any suitable programming language can be used to implement the routines of particular embodiments including C, C++, JAVA®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for rendering a stack trace visualization display associated with execution of an application, the method comprising:
receiving a first stack trace associated with execution of the application during a time period from a central processing unit (CPU) profiler; and
rendering a first stack trace visualization display comprising a plurality of stack frames stacked in accordance with an order of ancestry based on the first stack trace, wherein rendering at least one of the plurality of stack frames comprises:

rendering at a first location of the first stack trace visualization display a stack frame rectangle associated with the at least one of the plurality of stack frames in accordance with the order of ancestry; and rendering at a second location of the first stack trace visualization display, stack frame specific text associated with the at least one of the plurality of stack frames, the second location overlaying the first location, where the rendering of the stack frame rectangle is independent of the rendering of the stack frame specific text.

2. The method of claim 1, further comprising:
identifying a first set of stack frames from the plurality of stack frames, wherein the first set of stack frames are associated with a resource consumption that is greater than a resource consumption threshold; and
rendering only the first set of stack frames in the first stack trace visualization display of the first stack trace.

3. The method of claim 1, further comprising:
identifying a second set of stack frames from the plurality of stack frames, wherein a number of pixels associated with a width of the stack frames in the second set of stack frames is greater than a pixel width threshold; and
rendering only the second set of stack frames in the first stack trace visualization display of the first stack trace.

4. The method of claim 1, further comprising formatting the first stack trace visualization display in accordance with a flame graph display format.

5. The method of claim 1, further comprising:
identifying at least one path attribute for a first one of the plurality of stack frames in the first stack trace based on a JavaScript Object Notation (JSON) tree associated with the first one of the plurality of stack frames;
storing an association between the first one of the plurality of stack frames and the corresponding at least one path attribute;
receiving a zoom request for the first one of the plurality of stack frames;
retrieving the at least one path attribute corresponding to the first one of the plurality of stack frames; and
rendering a second stack trace representing a zoom view of the first one of the plurality of stack frames in accordance with the retrieved at least one path attribute.

6. The method of claim 1, further comprising:
receiving a search request for stack frame text;
identifying the stack frames associated with stack frame specific text including the stack frame text in the first stack trace; and
rendering a third stack trace visualization display including the plurality of stack frames of the first stack trace with the identified stack frame rendered as highlighted stack frames.

7. The method of claim 1, wherein a second one of the plurality of stack frames is associated with at least one key attribute, the method further comprising:
receiving a user provided key name for association with the second one of the plurality of stack frames and the corresponding at least one key attribute; and
receiving key values for the at least one key attribute for association with the user provided key names.

8. A system for rendering a stack trace visualization display associated with execution of an application, the system comprising:
at least one processor; and
at least one non-transitory machine-readable storage medium that stores instructions configurable to be executed by the at least one processor to:

receive a first stack trace associated with execution of the application during a time period from a central processing unit (CPU) profiler; and
render a first stack trace visualization display comprising a plurality of stack frames stacked in accordance with an order of ancestry based on the first stack trace, wherein rendering at least one of the plurality of stack frames comprises:
rendering at a first location of the first stack trace visualization display a stack frame rectangle associated with the at least one of the plurality of stack frames in accordance with the order of ancestry; and
rendering at a second location of the first stack trace visualization display, stack frame specific text associated with the at least one of the plurality of stack frames, the second location overlaying the first location, where the rendering of the stack frame rectangle is independent of the rendering of the stack frame specific text.

9. The system of claim 8, wherein the instructions are configurable to be executed by the at least one processor to:
identify a first set of stack frames from the plurality of stack frames, wherein the first set of stack frames are associated with a resource consumption that is greater than a resource consumption threshold; and
render only the first set of stack frames in the first stack trace visualization.

10. The system of claim 8, wherein the instructions are configurable to be executed by the at least one processor to:
identify a second set of stack frames from the plurality of stack frames, wherein a number of pixels associated with a width of the stack frames in the second set of stack frames is greater than a pixel width threshold; and
render only the second set of stack frames in the first stack trace visualization display of the first stack trace.

11. The system of claim 8, wherein the instructions are configurable to be executed by the at least one processor to format the first stack trace visualization display in accordance with a flame graph display format.

12. The system of claim 8, wherein the instructions are configurable to be executed by the at least one processor to:
identify at least one path attribute for a first one of the plurality of stack frames in the first stack trace based on a JavaScript Object Notation (JSON) tree associated with the first one of the plurality of stack frames;
store an association between the first one of the plurality of stack frames and the corresponding at least one path attribute;
receive a zoom request for the first one of the plurality of stack frames;
retrieve the at least one path attribute corresponding to the first one of the plurality of stack frames; and
render a second stack trace representing a zoom view of the first one of the plurality of stack frames in accordance with the retrieved at least one path attribute.

13. The system of claim 8, wherein the instructions are configurable to be executed by the at least one processor to:
receive a search request for stack frame text;
identify the stack frames associated with stack frame specific text including the stack frame text in the first stack trace; and
render a third stack trace visualization display including the plurality of stack frames of the first stack trace with the identified stack frame rendered as highlighted stack frames.

14. The system of claim 8, wherein a second one of the plurality of stack frames is associated with at least one key attribute and the instructions are configurable to be executed by the at least one processor to:
    receive a user provided key name for association with the second one of the plurality of stack frames and the corresponding at least one key attribute; and
    receive key values for the at least one key attribute for association with the user provided key names.

15. A non-transitory machine-readable storage medium that stores instructions executable by at least one processor, the instructions configurable to cause the at least one processor to perform operations comprising:
    receiving a first stack trace associated with execution of the application during a time period from a central processing unit (CPU) profiler; and
    rendering a first stack trace visualization display comprising a plurality of stack frames stacked in accordance with an order of ancestry based on the first stack trace, wherein rendering at least one of the plurality of stack frames comprises:
        rendering at a first location of the first stack trace visualization display a stack frame rectangle associated with the at least one of the plurality of stack frames in accordance with the order of ancestry; and
        rendering at a second location of the first stack trace visualization display, stack frame specific text associated with the at least one of the plurality of stack frames, the second location overlaying the first location, where the rendering of the stack frame rectangle is independent of the rendering of the stack frame specific text.

16. The non-transitory machine-readable storage medium of claim 15, wherein the instructions are configurable to cause the at least one processor to further perform operations comprising:
    identifying a first set of stack frames from the plurality of stack frames, wherein the first set of stack frames are associated with a resource consumption that is greater than a resource consumption threshold; and
    rendering only the first set of stack frames in the first stack trace visualization.

17. The non-transitory machine-readable storage medium of claim 15, wherein the instructions are configurable to cause the at least one processor to further perform operations comprising:
    identifying a second set of stack frames from the plurality of stack frames, wherein a number of pixels associated with a width of the stack frames in the second set of stack frames is greater than a pixel width threshold; and
    rendering only the second set of stack frames in the first stack trace visualization display of the first stack trace.

18. The non-transitory machine-readable storage medium of claim 15, wherein the instructions are configurable to cause the at least one processor to further perform operations comprising formatting the first stack trace visualization display in accordance with a flame graph display format.

19. The non-transitory machine-readable storage medium of claim 15, wherein the instructions are configurable to cause the at least one processor to further perform operations comprising:
    identifying at least one path attribute for a first one of the plurality of stack frames in the first stack trace based on a JavaScript Object Notation (JSON) tree associated with the first one of the plurality of stack frames;
    storing an association between the first one of the plurality of stack frames and the corresponding at least one path attribute;
    receiving a zoom request for the first one of the plurality of stack frames;
    retrieving the at least one path attribute corresponding to the first one of the plurality of stack frames; and
    rendering a second stack trace representing a zoom view of the first one of the plurality of stack frames in accordance with the retrieved at least one path attribute.

20. The non-transitory machine-readable storage medium of claim 15, wherein the instructions are configurable to cause the at least one processor to further perform operations comprising:
    receiving a search request for stack frame text;
    identifying the stack frames associated with stack frame specific text including the stack frame text in the first stack trace; and
    rendering a third stack trace visualization display including the plurality of stack frames of the first stack trace with the identified stack frame rendered as highlighted stack frames.

\* \* \* \* \*